United States Patent
Solomon

(10) Patent No.: US 11,838,205 B2
(45) Date of Patent: *Dec. 5, 2023

(54) TUNNEL PROVISIONING WITH LINK AGGREGATION

(71) Applicant: CORRIGENT CORPORATION, West Newbury, MA (US)

(72) Inventor: Ronen Solomon, Ramat Gan (IL)

(73) Assignee: CORRIGENT CORPORATION, West Newbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,572

(22) Filed: Aug. 7, 2022

(65) Prior Publication Data

US 2022/0377010 A1    Nov. 24, 2022

Related U.S. Application Data

(63) Continuation of application No. 17/143,189, filed on Jan. 7, 2021, now Pat. No. 11,418,437, which is a
(Continued)

(51) Int. Cl.
*H04L 45/50* (2022.01)
*H04L 47/70* (2022.01)
(Continued)

(52) U.S. Cl.
CPC .............. *H04L 45/50* (2013.01); *H04L 45/00* (2013.01); *H04L 45/04* (2013.01); *H04L 45/245* (2013.01);
(Continued)

(58) Field of Classification Search
CPC ... H04L 12/5695; H04L 45/04; H04L 45/245; H04L 45/50; H04L 45/502; H04L 47/724; H04L 47/728; H04L 47/825; H04L 47/829

See application file for complete search history.

(56) References Cited

U.S. PATENT DOCUMENTS

| 3,411,507 A | 11/1968 | Wingrove |
| 4,535,785 A | 8/1985 | van den Honert et al. |
| | (Continued) | |

FOREIGN PATENT DOCUMENTS

| JP | 2005020492 A * | 1/2005 |
| WO | 01/10375 A2 | 2/2001 |

OTHER PUBLICATIONS

Kireeti Kompella, "Internet Draft: Link Bundling in MPLS Traffic Engineering," Dec. 2004, Internet Engineering Task Force, <tools.ietf.org/id/d raft-ietf-mpls-bu ndle-06.txt>.
(Continued)

*Primary Examiner* — Mounir Moutaouakil
(74) *Attorney, Agent, or Firm* — May Patents Ltd.

(57) ABSTRACT

A method for processing data packets in a communication network includes establishing a path for a flow of the data packets through the communication network. At a node along the path having a plurality of aggregated ports, a port is selected from among the plurality to serve as part of the path. A label is chosen responsively to the selected port. The label is attached to the data packets in the flow at a point on the path upstream from the node. Upon receiving the data packets at the node, the data packets are switched through the selected port responsively to the label.

29 Claims, 3 Drawing Sheets

Related U.S. Application Data continuation of application No. 16/693,307, filed on Nov. 24, 2019, now Pat. No. 10,911,350, which is a continuation of application No. 16/358,847, filed on Mar. 20, 2019, now Pat. No. 10,523,561, which is a continuation of application No. 15/972,249, filed on May 7, 2018, now Pat. No. 10,250,495, which is a continuation of application No. 15/679,179, filed on Aug. 17, 2017, now Pat. No. 9,967,180, which is a continuation of application No. 15/415,933, filed on Jan. 26, 2017, now Pat. No. 9,749,228, which is a continuation of application No. 14/834,480, filed on Aug. 25, 2015, now Pat. No. 9,590,899, which is a continuation of application No. 13/969,520, filed on Aug. 17, 2012, now Pat. No. 9,118,602, which is a continuation of application No. 13/116,696, filed on May 26, 2011, now Pat. No. 8,537,682, which is a continuation of application No. 11/123,801, filed on May 6, 2005, now Pat. No. 7,974,202.

(51) Int. Cl.
  H04L 45/02      (2022.01)
  H04L 45/24      (2022.01)
  H04L 47/724     (2022.01)
  H04L 47/726     (2022.01)
  H04L 45/00      (2022.01)
  H04L 45/74      (2022.01)

(52) U.S. Cl.
  CPC ............ *H04L 45/502* (2013.01); *H04L 45/66* (2013.01); *H04L 45/74* (2013.01); *H04L 47/70* (2013.01); *H04L 47/724* (2013.01); *H04L 47/728* (2013.01); *H04L 47/825* (2013.01); *H04L 47/829* (2013.01); *Y02D 30/50* (2020.08)

(56) References Cited

U.S. PATENT DOCUMENTS

| | | |
|---|---|---|
| 4,608,985 A | 2/1986 | Crish et al. |
| 4,573,481 A | 4/1986 | Bullara |
| 4,602,624 A | 7/1986 | Naples et al. |
| 4,628,942 A | 12/1986 | Sweeney et al. |
| 4,649,936 A | 3/1987 | Ungar et al. |
| 4,702,254 A | 10/1987 | Zabara |
| 4,739,764 A | 4/1988 | Lue et al. |
| 4,867,164 A | 9/1989 | Zabara |
| 4,962,751 A | 10/1990 | Krauter |
| 5,025,807 A | 6/1991 | Zabara |
| 5,188,104 A | 2/1993 | Wernicke et al. |
| 5,199,430 A | 4/1993 | Fang et al. |
| 5,205,285 A | 4/1993 | Baker, Jr. |
| 5,215,086 A | 6/1993 | Terry, Jr. et al. |
| 5,263,480 A | 11/1993 | Wernicke et al. |
| 5,282,468 A | 2/1994 | Klepinski |
| 5,299,569 A | 5/1994 | Wernicke et al. |
| 5,285,441 A | 8/1994 | Bansal et al. |
| 5,292,344 A | 8/1994 | Douglas |
| 5,335,657 A | 9/1994 | Terry, Jr. et al. |
| 5,423,872 A | 6/1995 | Cigaina |
| 5,440,549 A | 8/1995 | Min |
| 5,571,150 A | 5/1996 | Wernicke et al. |
| 5,540,730 A | 7/1996 | Terry, Jr. et al. |
| 5,540,734 A | 7/1996 | Zabara |
| 5,634,006 A | 5/1997 | Baugher et al. |
| 5,690,691 A | 11/1997 | Chen et al. |
| 5,707,400 A | 1/1998 | Terry, Jr. et al. |
| 5,716,385 A | 2/1998 | Mittal et al. |
| 5,755,750 A | 5/1998 | Petruska et al. |
| 5,836,994 A | 11/1998 | Bourgeois |
| 6,026,326 A | 2/2000 | Bardy |
| 6,083,249 A | 7/2000 | Familoni |
| 6,091,992 A | 7/2000 | Bourgeois et al. |
| 6,097,984 A | 8/2000 | Douglas |
| 6,104,955 A | 8/2000 | Bourgeois |
| 6,128,292 A | 10/2000 | Kim |
| 6,147,993 A | 11/2000 | Kloth et al. |
| 6,151,297 A | 11/2000 | Congdon et al. |
| 6,205,359 B1 | 3/2001 | Boveja |
| 6,205,488 B1 | 3/2001 | Casey et al. |
| 6,275,493 B1 | 8/2001 | Morris et al. |
| 6,304,575 B1 | 10/2001 | Carroll et al. |
| 6,339,595 B1 | 1/2002 | Rekhter et al. |
| 6,466,985 B1 | 10/2002 | Goyal et al. |
| 6,499,061 B1 | 12/2002 | Benayoun |
| 6,553,029 B1 | 4/2003 | Alexander |
| 6,563,793 B1 | 5/2003 | Golden |
| 6,600,741 B1 | 7/2003 | Chrin et al. |
| 6,604,136 B1 | 8/2003 | Chang et al. |
| 6,628,624 B1 | 9/2003 | Mahajan et al. |
| 6,665,273 B1 | 12/2003 | Goguen et al. |
| 6,700,894 B1 | 3/2004 | Shung |
| 6,735,198 B1 | 5/2004 | Edsall et al. |
| 6,760,775 B1 | 7/2004 | Anerousis et al. |
| 6,765,921 B1 | 7/2004 | Stacey et al. |
| 6,788,681 B1 | 7/2004 | Hurren et al. |
| 6,778,496 B1 | 8/2004 | Meempat et al. |
| 6,785,226 B1 | 8/2004 | Oltman et al. |
| 6,795,394 B1 | 9/2004 | Swinkels et al. |
| 6,886,043 B1 | 4/2005 | Mauger et al. |
| 6,963,578 B2 | 8/2005 | Akahane et al. |
| 6,977,932 B1 | 12/2005 | Hauck |
| 7,092,356 B2 | 8/2006 | Rabie et al. |
| 7,126,907 B2 | 10/2006 | Carpini |
| 7,212,490 B1 | 1/2007 | Kao et al. |
| 7,197,008 B1 | 3/2007 | Shabtay et al. |
| 7,203,762 B2 | 4/2007 | Yamada et al. |
| 7,248,561 B2 | 7/2007 | Ishibashi et al. |
| 7,260,097 B2 | 8/2007 | Casey |
| 7,277,386 B1 | 10/2007 | Ferguson |
| 7,345,991 B1 | 3/2008 | Shabtay et al. |
| 7,466,697 B1 * | 12/2008 | Raz .................. H04L 45/22 370/466 |
| 7,477,657 B1 | 1/2009 | Murphy et al. |
| 7,519,056 B2 | 4/2009 | Ishwar et al. |
| 7,606,235 B1 | 10/2009 | Ayyangar et al. |
| 7,623,455 B2 | 11/2009 | Hilla et al. |
| 7,974,284 B2 | 7/2011 | Chen et al. |
| 7,983,286 B2 | 7/2011 | Rekhter |
| 8,005,096 B2 | 8/2011 | Hardy |
| 8,312,145 B2 | 11/2012 | Rabie et al. |
| 8,315,255 B1 | 11/2012 | Casey |
| 8,693,323 B1 | 4/2014 | McDysan |
| 2001/0032271 A1 | 10/2001 | Allen |
| 2002/0101868 A1 | 8/2002 | Clear |
| 2002/0110087 A1 | 8/2002 | Zelig |
| 2002/0176450 A1 | 11/2002 | Kong et al. |
| 2003/0009582 A1 | 1/2003 | Qiao et al. |
| 2003/0020976 A1 | 1/2003 | Krishnaswamy et al. |
| 2003/0185217 A1 | 2/2003 | Ganti et al. |
| 2003/0103449 A1 | 5/2003 | Barsheshet et al. |
| 2003/0147352 A1 | 7/2003 | Ishibashi et al. |
| 2003/0152024 A1 | 8/2003 | Yang et al. |
| 2003/0174706 A1 | 9/2003 | Shankar et al. |
| 2003/0227919 A1 | 11/2003 | Zelig et al. |
| 2004/0008687 A1 | 1/2004 | Matsubara |
| 2004/0017816 A1 | 1/2004 | Ishwar et al. |
| 2004/0052207 A1 | 3/2004 | Charny |
| 2004/0073694 A1* | 4/2004 | Frank .................. H04L 47/24 370/412 |
| 2004/0107285 A1 | 6/2004 | Larson et al. |
| 2004/0109408 A1 | 6/2004 | Mesh et al. |
| 2004/0125745 A9 | 7/2004 | Dang |
| 2004/0156313 A1 | 8/2004 | Hofmeister et al. |
| 2004/0202171 A1 | 10/2004 | Hama |
| 2004/0228278 A1 | 11/2004 | Bruckman et al. |
| 2005/0071335 A1 | 3/2005 | Kadatch |
| 2005/0083928 A1 | 4/2005 | Sivabalan et al. |
| 2005/0090275 A1 | 4/2005 | Wang |
| 2005/0125490 A1 | 6/2005 | Ramia |

(56) References Cited

U.S. PATENT DOCUMENTS

| | | |
|---|---|---|
| 2005/0160171 A1 | 7/2005 | Rabie et al. |
| 2005/0163115 A1 | 7/2005 | Dontu et al. |
| 2005/0169279 A1 | 8/2005 | Magd |
| 2005/0249121 A1 | 11/2005 | Matsunaga |
| 2006/0251106 A1 | 11/2006 | Nakagawa |
| 2007/0038767 A1 | 2/2007 | Miles et al. |
| 2008/0031263 A1 | 2/2008 | Ervin et al. |
| 2008/0037988 A1 | 2/2008 | Bullock |
| 2011/0206057 A1 | 8/2011 | Rekhter |

OTHER PUBLICATIONS

D. Awduche, et al., Request for Comments (RFC) 3209 of the Internet Engineering Task Force (IETF), Dec. 2001.

Baker, et al., in IEFT RFC 1638, "PPP Bridging Control Protocol (BCP)" Jun. 1994.

R. Braden, et al., Request for Comments (RFC) 2892 of the Internet Engineering Task Force (IETF) Aug. 2000.

Bradley, et al., in IETF RFC 1490, "Multiprotocol Interconnect over Frame Relay", Jul. 1993.

Deering, RFC 1112, "Host Extensions for IP Multicasting," Aug. 1989.

Finlayson, R., et al., "A Reverse Address Resolution Protocol" RFC 903, Jun. 1984, pp. 1-5.

Malkin, G., "RIP Version 2," FRC 2453, Nov. 1998, pp. 1-39.

Mamakos, et al. "A Method for Transmitting PPP Over Ethernet (PPPoE)", in IETF RFC 2516, Feb. 1999.

Martini, et al., in an IETF Draft Entitiled: "Encapsulation Methods for transport of layer 2 Frames over MPLS", May 2001 (Available at: search.ietf.org/internet-drafts/drafts-martini-12circuit-encap-mpls-02.txt.).

Martini, et al., Internet Draft, entitled: "Transport of Layer 2 Frames over MPLS", May 2001. (Available at: search.ietf.org/internet-drafts/drafts-martini-12circuit-encap-mpls-02.txt.).

Plummer, D. "An Ethernet address Resolution Protocol," RFC 826, Nov. 1982, pp. 1-9.

Rosen, et al., in Request for Comments (RFC) 3031 of the Internet Engineering Task Force (IETF), entitled: "Multiprotocol Label Switching Architecture", Jan. 2001. (Available at: www.ietf.orgrfc.html).

D. Tsiang, et al., Request for Comments (RFC) 2892 of the Internet Engineering Task Force (IETF), Aug. 2000.

Braden, et al., RFC 2205, entitled "Resource ReSerVation Protocol (RSVP)-Version 1 Functional Specification", Sep. 1997.

M. Kodialam, "Dynamic Routing of Locally Restorable Bandwidth Guaranteed Tunnels Using Aggregated Link Usage Information," Apr. 22, 2001, INFOCOM 2001, Twentieth Annual Joint Conference of the IEEE Computer and Communication Socieities, vol. 1, p. 376-385.

Mwingira et al., Link Aggregation, over view of the IEEE 802.3ad-2000 (clause 43), 28 pages, 2003.

RFC 3021, "Using 31-Bit Prefixes on IPv4 Point-to-Point Links", Dec. 2000 (10 pages).

IEEE Std 802.3ad-2000, "Amendment to Carrier Sense Multiple Access with Collision Detection (CSMA/CD) Access Method and Physical Layer Specifications—Aggregation of Multiple Link Segments" Approved Mar. 30, 2000 (183 pages).

Nadeau, Thomas D., "Multi-Protocol Label Switching", MPLS Network Management, 2003 (25 pages).

Request for Comments 3031 "Multiprotocol Label Switching Architecture", Jan. 2001 (61 pages).

Yan, Peter Y., et al., "Multi-channel Deflection Crossbar (MCDC): A VLSI Optimized Architecture For Multi-channel ATM Switching", 1997 (8 pages).

Request for Comments 1583, "OSPF Version 2", Mar. 1994 (132 pages).

* cited by examiner

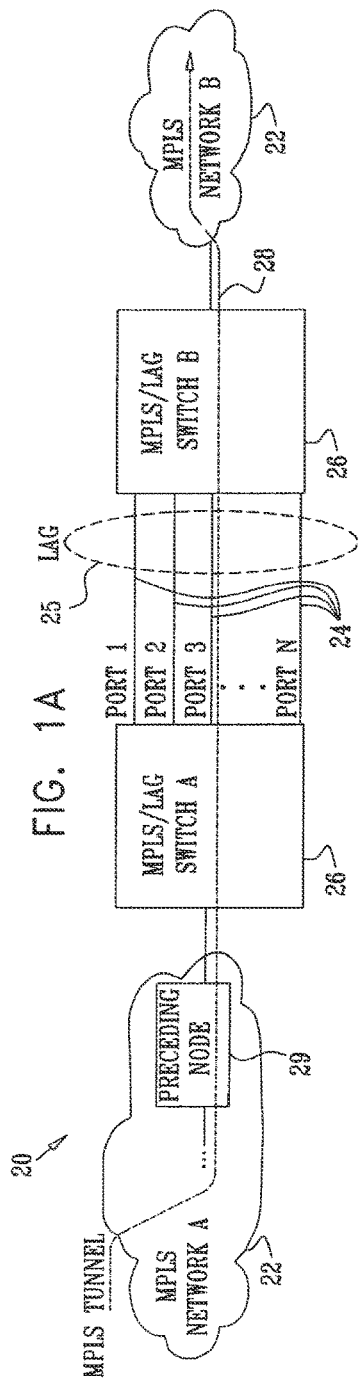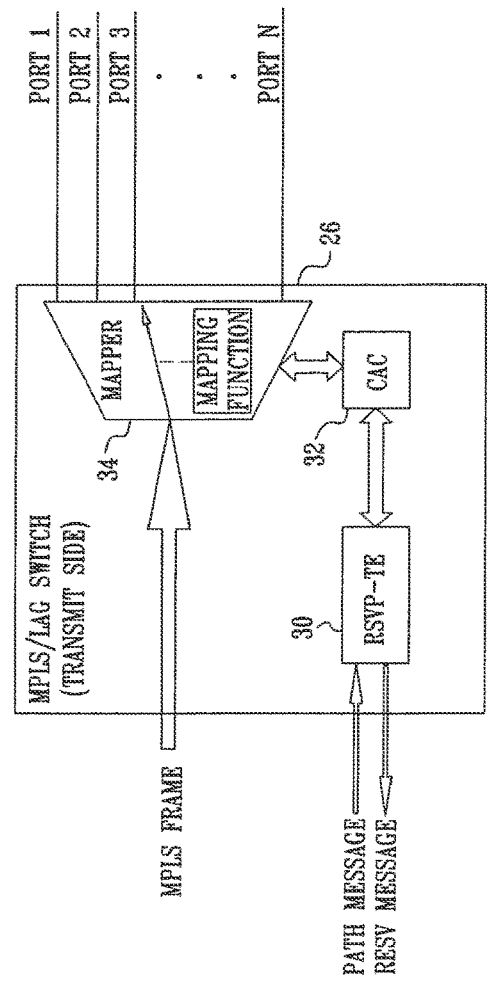

TUNNEL PROVISIONING WITH LINK AGGREGATION

CROSS-REFERENCE TO RELATED APPLICATIONS

This application is a continuation of, and claims priority to co-pending U.S. non-provisional patent application entitled "Tunnel Provisioning With Link Aggregation," having U.S. Ser. No. 15/972,249, filed May 7, 2018, which is a continuation of, and claims priority to, U.S. Ser. No. 15/679,179, filed Aug. 17, 2017 (U.S. Pat. No. 9,967,180, issued May 8, 2018), which is a continuation of, and claims priority to, U.S. Ser. No. 15/415,933, filed Jan. 26, 2017 2015 (U.S. Pat. No. 9,749,228, issued Aug. 29, 2017), which is a continuation of, and claims priority to, U.S. Ser. No. 14/834,480, filed Aug. 25, 2015 (U.S. Pat. No. 9,590,899, issued Mar. 7, 2017), which is a continuation of, and claims priority to, U.S. Ser. No. 13/969,520, filed Aug. 17, 2013 (U.S. Pat. No. 9,118,602, issued Aug. 25, 2015), which is a continuation of, and claims priority to, U.S. Ser. No. 13/116,696, filed May 26, 2011 (U.S. Pat. No. 8,837,682, issued Sep. 17, 2013), which is a continuation of, and claims priority to, U.S. Ser. No. 11/123,801, filed May 6, 2005 (U.S. Pat. No. 7,974,202, issued Jul. 5, 2011), each of which are hereby incorporated by reference in their entirety.

FIELD OF THE INVENTION

The present invention relates generally to communication networks, and particularly to methods and systems for performing link aggregation in tunneled networks.

BACKGROUND OF THE INVENTION

Multiprotocol Label Switching

Multiprotocol Label Switching (MPLS) has gained popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This RFC, as well as other IETF RFCs cited herein below, is available at www.ietf.org/rfc.

In MPLS, each packet is assigned to a Forwarding Equivalence Class (FEC) when it enters the network, depending on its destination address. The packet receives a fixed-length label, referred to as an "MPLS label" identifying the FEC to which it belongs. All packets in a given FEC are passed through the network over the same path by label-switching routers (LSRs). The flow of packets along a label-switched path (LSP) under MPLS is completely specified by the label applied at the ingress node of the path. Therefore, an LSP can be viewed as a tunnel through the network.

MPLS defines a label distribution protocol (LDP) by which one LSR informs another of the meaning of labels used to forward traffic between and through them. Another example is RSVP-TE, which is described by Awduche et al., in IETF RFC 3209 entitled "RSVP-TE: Extensions to RSVP for LSP Tunnels" (December, 2001), which is incorporated herein by reference. RSVP-TE extends the well-known Resource Reservation Protocol (RSVP), allowing the establishment of explicitly-routed LSPs using RSVP as a signaling protocol. RSVP itself is described by Braden et al., in IETF RFC 2205, entitled "Resource ReSerVation Protocol (RSVP)—Version 1 Functional Specification" (September, 1997), which is incorporated herein by reference.

Section 1 of RFC 2205 defines an "admission control" decision module, which is used during reservation setup to determine whether a node has sufficient available resources to supply the requested quality of service. The admission control module is used in RSVP-TE for setting up MPLS tunnels.

U.S. Patent Application Publication US 2002/0110087 A1, entitled "Efficient Setup of Label-Switched Connections," whose disclosure is incorporated herein by reference, describes methods and systems for carrying layer 2 services, such as Ethernet frames, through label-switched network tunnels.

Ethernet Link Aggregation

Link aggregation (LAG) is a technique by which a group of parallel physical links between two endpoints in a data network can be joined together into a single logical link (referred to as a "LAG group"). Traffic transmitted between the endpoints is distributed among the physical links in a manner that is transparent to the clients that send and receive the traffic. For Ethernet networks, link aggregation is defined by Clause 43 of IEEE Standard 802.3ad, Carrier Sense Multiple Access with Collision Detection (CSMA/CD) Access Method and Physical Layer Specifications (2002 Edition), which is incorporated herein by reference. Clause 43 defines a link aggregation protocol sub-layer, which interfaces between the standard Media Access Control (MAC) layer functions of the physical links in a link aggregation group and the MAC clients that transmit and receive traffic over the aggregated links.

U.S. Patent Application Publication US 2004/0228278 A1, entitled "Bandwidth Allocation for link Aggregation," the disclosure of which is incorporated herein by reference, describes methods for bandwidth allocation in a link aggregation system. The methods described in this publication are meant to ensure that sufficient bandwidth will be available on the links in the group in order to meet service guarantees, notwithstanding load fluctuations and link failures.

SUMMARY OF THE INVENTION

Embodiments of the present invention provide tunnel provisioning with link aggregation. Briefly described, a first aspect of the present invention is directed to a method for assigning and utilizing an Ethernet physical data port in an Ethernet Link Aggregation Group (LAG) in a Multi-Protocol Label Switching (MPLS) network. The method includes the steps of selecting, by a first MPLS/LAG switch, from a plurality of physical data ports in said first MPLS/LAG switch, a single physical tunnel port which meets a bandwidth requirement of a network tunnel, wherein said single physical tunnel port has a port serial number, assigning, by said first MPLS/LAG switch, said single physical tunnel port to said network tunnel, preparing, by said first MPLS/LAG switch, a data packet label by which said single physical tunnel port may be identified, receiving, by said first MPLS/LAG switch, a data packet including said data packet label at said first MPLS/LAG switch, and switching, by said first MPLS/LAG switch, said data packet to said single physical tunnel port according to said serial port number, and sending said data packet to a second MPLS/LAG switch via said single physical tunnel port.

A second aspect of the present invention includes a method for tagging a packet for transport through an Ethernet physical data port in an Ethernet Link Aggregation Group (LAG) located downstream from a preceding node in a Multi-Protocol Label Switching (MPLS) network tunnel employing Resource Reservation Protocol Traffic Engineering (RSVP-TE) tunnel provisioning. The method includes the steps of sending downstream to a MPLS/LAG switch, by the preceding node, an RSVP-TE PATH message, the RSVP-TE PATH message including a LABEL_REQUEST object requesting a network tunnel, and a bandwidth requirement, receiving, by the preceding node, a packet label sent by the MPLS/LAG switch, said packet label including a serial number of a single physical tunnel port in the MPLS/LAG switch, and wherein the single physical tunnel port meets the bandwidth requirement, attaching by the preceding node, said data packet label to a data packet sent by the preceding node, wherein the data packet is intended to be forwarded via the single physical tunnel port, and sending downstream to the MPLS/LAG switch, by the preceding node, a data packet including said data packet label.

A third aspect of the present invention includes an apparatus for assigning and utilizing an Ethernet physical data port in an Ethernet Link Aggregation Group (LAG) located downstream from a preceding node in a Multi-Protocol Label Switching (MPLS) network tunnel employing Resource Reservation Protocol Traffic Engineering (RSVP-TE) tunnel provisioning, the LAG having a first MPLS/LAG switch and a second MPLS/LAG switch. The apparatus includes a processor, which is configured to receive a tunnel configuration request message from the preceding node make a selection from a plurality of physical data ports in said first MPLS/LAG switch, of a single physical tunnel port which meets a bandwidth requirement of the network tunnel, wherein said single physical tunnel port has a port serial number, assign said single physical tunnel port to the network tunnel, prepare a data packet label, by which said single physical tunnel port may be identified, dedicate a sub-set of bits of said data packet label to encode said port serial number of said single physical tunnel port, and publish said packet label upstream.

The apparatus includes a mapper configured to receive a data packet from an upstream node, detect said data packet label in said data packet, and if said data packet contains said data packet label, to direct the first MPLS/LAG switch to switch said data packet to said single physical tunnel port, and send said data packet to the second MPLS/LAG switch via said single physical tunnel port.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

FIG. 1A is a block diagram that schematically illustrates an MPLS communication network, in accordance with an embodiment of the present invention;

FIG. 1B is a block diagram that schematically illustrates an MPLS/LAG switch, in accordance with an embodiment of the present invention;

DETAILED DESCRIPTION OF EMBODIMENTS

Figure 2:
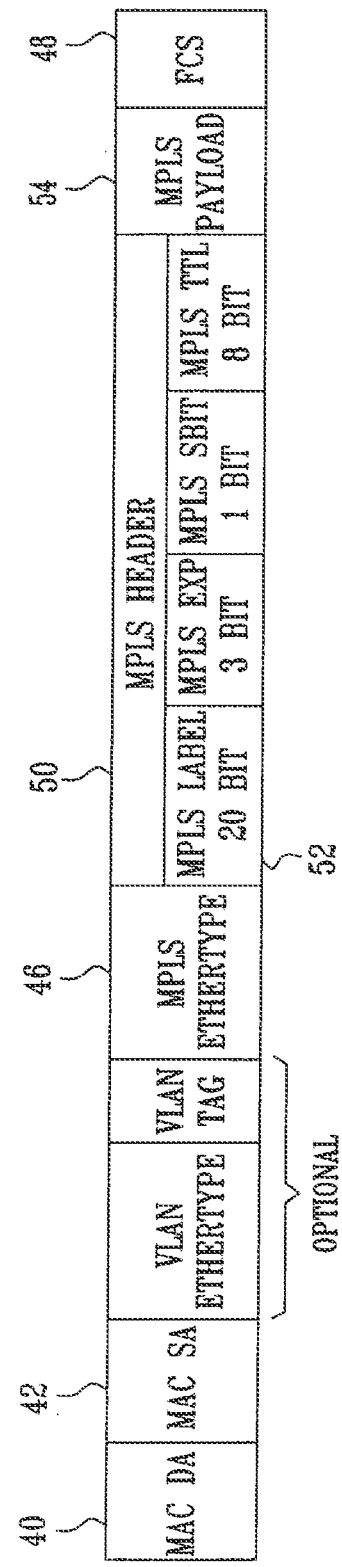
FIG. 2 is a block diagram that schematically illustrates an encapsulated MPLS packet, in accordance with an embodiment of the present invention.

FIG. 1A is a block diagram that schematically illustrates a computer communication network 20, in accordance with an embodiment of the present invention. System 20 includes two MPLS networks 22, labeled A and B, i.e., networks containing MPLS-capable switches. (Typically, these networks may also carry non-MPLS traffic, as in MPLS-capable IP networks that are known in the art.) MPLS networks A and B are connected via MPLS/LAG switches 26, using N physical Ethernet ports 24. Ports 24 are aggregated into a LAG group 25 using link aggregation (LAG) methods defined in the IEEE 802.3ad specification cited above. The two MPLS/LAG switches 26, which also function as LSRs, perform link aggregation and other packet routing/switching functions, according to methods which will be described below.

An MPLS tunnel 28 (a label switched path, or LSP, according to the MPLS specification cited above) is established from an ingress node in MPLS network A, through the two switches and the LAG group, to an egress node in MPLS network B. (The ingress and egress nodes are not shown in the figure.) The tunnel forms a path over which data frames traverse from the ingress node to the egress node. In the exemplary configuration of FIG. 1A, the MPLS tunnel is switched through one of ports 24, labeled "PORT 3." The term "downstream" typically denotes the direction of packet flow from the ingress node to the egress node along the tunnel. The term "upstream" denotes the opposite direction. The term "hop" denotes a part of the tunnel that connects two consecutive LSRs.

As part of the MPLS tunnel provisioning process (which is described in RFC 3031) each LSR along tunnel 28 attaches an MPLS label to the packets it transmits downstream to the next LSR, identifying the packets that belong to tunnel 28. Thus, in the example shown in FIG. 1A, MPLS/LAG switch A receives packets to which MPLS labels have been attached at a preceding node 29, which is an LSR located in MPLS network A, upstream from MPLS/LAG switch A. In most MPLS implementations, a given MPLS label is used within a single hop along the tunnel. In this case node 29 is the LSR that immediately precedes MPLS/LAG switch A in tunnel 28. In other MPLS implementations, the same label may be used for several adjacent hops of the tunnel, so that there may be one or more additional LSRs located between node 29 and switch A.

The exemplary network configuration shown in FIG. 1A was chosen for the sake of conceptual clarity. Other tunneled network configurations with link aggregation may use the methods and systems disclosed herein, as will be apparent to those skilled in the art. As noted earlier, these configurations may use MPLS and Ethernet LAG or other tunneling and link aggregation protocols known in the art.

FIG. 1B is a block diagram that schematically shows details of MPLS/LAG switch 26, in accordance with an embodiment of the present invention. On the transmitting side of the LAG group, the switch typically receives an MPLS payload, encapsulated in Ethernet frames from the ingress node (either directly or via other LSRs in MPLS network A). Switch 26 switches the MPLS payload according to the MPLS label and re-encapsulates the MPLS payload into an Ethernet frame destined to the LAG group. Following the MPLS switching process, the MPLS switch performs the LAG function and maps the Ethernet frame to one of the physical Ethernet ports 24 of LAG group 25. On the receiving side of the LAG group, the switch collects the Ethernet frames from the ports of LAG group 25 and sends them to the egress node (either directly or via other LSRs, as defined by the tunnel).

Switch 26 has an RSVP-TE processor 30 and a CAC (Connection Admission Control) processor 32, which handle MPLS tunnel provisioning and the associated signaling. Although processors 30 and 32 are shown, for the sake of conceptual clarity, as separate functional units, in practice these two functions are typically implemented as software processes on the same processor. Practically speaking, they may generally be regarded as a single processor, regardless of implementation. Switch 26 also has a mapper 34, which maps each MPLS payload to a specific physical Ethernet port 24 (following the payload encapsulation into an Ethernet frame), according to methods which will be described below.

The methods described herein typically address a unidirectional packet flow, i.e., packets flowing from MPLS network A to MPLS network B. The methods are presented in this way because MPLS tunnels are unidirectional by definition. This fact does not limit the disclosed methods in any way to unidirectional message flows. Bidirectional packet flow is typically implemented by setting up two separate, independent MPLS tunnels.

MPLS/LAG switch 26 may be implemented using a network processor, which is programmed in software to carry out the functions described herein and is coupled to suitable hardware for interfacing with the MPLS network and Ethernet ports. Switch 26 may either include a stand-alone unit or may alternatively be integrated with other computing functions of the network processor. Some or all of the functions of switch 26 can also be implemented using a suitable general-purpose computer, a programmable logic device, an application-specific integrated circuit (ASIC) or a combination of such elements.

FIG. 2 is a block diagram that schematically illustrates an MPLS packet encapsulated into an Ethernet II format, in accordance with an embodiment of the present invention. The Ethernet frame includes a MAC (Media Access Control) destination address field 40, a MAC source address field 42, and an Ethertype identifier field 46 used to identify the specific protocol. The frame ends with a frame check sequence (FCS) field 48 used for error detection. The encapsulated MPLS packet include an MPLS header 50, which has an MPLS label field 52. An MPLS payload field 54 includes the message body, containing information transmitted by the MPLS packet. In some implementations, the frame also includes optional VLAN Ethertype and VLAN tag fields.

Mapper 34 of switch 26 performs a mapping function that uses information carried in one or more fields of the encapsulated MPLS packet to select the physical Ethernet port for mapping the packet. The IEEE 802.3ad standard cited above does not dictate any particular mapping method for link aggregation, other than forbidding frame duplication and requiring that frame ordering be maintained over all frames in a given flow. In practice, to meet these requirements, the mapper typically maps all frames in a given MPLS tunnel to the same physical port.

The mapping function typically uses MPLS label 52 for mapping, since the MPLS label uniquely identifies MPLS tunnel 28, and it is required that all MPLS packets belonging to the same tunnel be switched through the same physical port 24. Additionally or alternatively, the mapping function uses a "PW" label (pseudo wire label, formerly known as a virtual connection, or VC label), which is optionally added to MPLS header 50. The PW label includes information that the egress node requires for delivering the packet to its destination, and is optionally added during the encapsulation of MPLS packets. Additional details regarding the VC label can be found in an IETF draft by Martini et al. entitled "Encapsulation Methods for Transport of Ethernet Frames Over IP/MPLS Networks" (IETF draft-ietf-pwe3-ethernet-encap-07.txt, May, 2004), which is incorporated herein by reference. In some embodiments, mapper 34 applies a hashing function to the MPLS and/or PW label, as will be described below.

Port Coding

Figure 3:
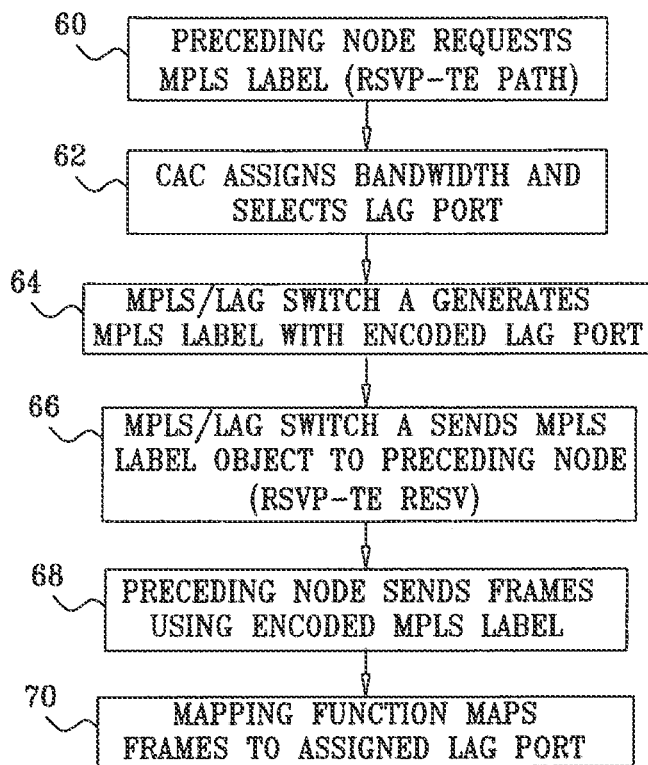
FIG. 3 is a flow chart that schematically illustrates a method for port allocation, in accordance with an embodiment of the present invention.

FIG. 3 is a flow chart that schematically illustrates a method for port allocation using port coding, in accordance with an embodiment of the present invention. This method, as well as the method of FIG. 4 described below, is used to provision MPLS tunnel 28 by allocating bandwidth on one of the physical ports of LAG group 25.

The method of FIG. 3 begins when the preceding node asks to establish a part of tunnel 28 (having one or more hops) for sending MPLS packets to MPLS/LAG switch 26 A. The preceding node requests and then receives the MPLS label, which it will subsequently attach to all packets that are sent to MPLS/LAG switch 26 labeled A. The preceding node sends downstream an RSVP-TE PATH message augmented with a LABEL_REQUEST object, as defined by RSVP-TE, to MPLS/LAG switch A, at a label requesting step 60. The PATH message typically includes information regarding service properties that are requested for tunnel 28. The service properties may include a guaranteed bandwidth (sometimes denoted CIR—Committed Information Rate) and a peak bandwidth (sometimes denoted PIR—Peak Information Rate), as well as a requested CoS (Class of Service—a measure of packet priority).

CAC processor 32 of switch A receives the PATH message and extracts the requested service properties. The CAC processor examines the available bandwidth of all ports 24 in LAG group 25 and selects a single physical port ("the selected physical port") on which to allocate bandwidth for MPLS tunnel 28, responsively to the requested service properties, at a port selection step 62. The selected physical port should be capable of providing sufficient peak and average bandwidths, as requested by the preceding node (and, originally, by the ingress node).

In one embodiment the CAC processor selects the physical port having a maximum available bandwidth out of the ports of LAG group 25. This approach attempts to distribute the packet flows evenly among the physical ports. In an alternative embodiment, the CAC processor may follow a "first-to-fill" strategy, i.e., select a physical port that will reach the highest utilization after allocating the requested bandwidth to tunnel 28. Any other suitable selection criteria may be applied by CAC processor 32. In the event that none of physical ports 24 has sufficient available bandwidth to comply with the requested service properties, the CAC processor returns an error message to the preceding node and denies the provisioning of tunnel 28. After successfully selecting the physical port, the CAC processor allocates and reserves the requested bandwidth for tunnel 28.

Regardless of the selection criterion used, the results of step 62 are that (1) a single physical port is explicitly selected and assigned to MPLS tunnel 28, and (2) sufficient bandwidth is allocated to tunnel 28, considering only the available bandwidth of the selected physical port, rather than the total available bandwidth of LAG group 25. All packets belonging to tunnel 28 will be switched through the same selected physical port, using the port coding technique described herein below.

Having selected a physical port, RSVP-TE processor 30 of switch A now generates a suitable MPLS label, at a label generation step 64. The preceding node upstream of switch A will subsequently attach this MPLS label to all MPLS packets transmitted through tunnel 28 to switch A. The label is assigned, in conjunction with the mapping function of mapper 34, so as to ensure that all MPLS packets carrying this label are switched through the physical port that was selected for this tunnel at step 62. For this purpose, RSVP-TE processor 30 of switch A dedicates a sub-set of the bits of MPLS label 52 to encode the serial number of the selected physical port. For example, the four least-significant bits of MPLS label 52 may be used for encoding the selected port number. This configuration is suitable for representing LAG groups having up to 16 physical ports (N<16). The remaining bits of MPLS label 52 may be chosen at random or using any suitable method known in the art.

RSVP-TE processor of switch 26 sends the generated MPLS label upstream to the preceding node, using an RSVP-TE RESV message augmented with a LABEL object, at a label sending step 66. At this stage, the part of tunnel 28 between the preceding node and switch A is provisioned and ready for use. The preceding node attaches the aforementioned MPLS label to all subsequent MPLS packets that it sends downstream through tunnel 28 to MPLS/LAG switch A, at a packet sending step 68.

Mapper 34 of switch A maps the received packets belonging to tunnel 28 to the selected physical Ethernet port at a mapping step 70. For this purpose, mapper 34 extracts the MPLS label from each received packet and decodes the selected physical port number from the dedicated sub-set of bits, such as the four LSB, as described in step 64 above. The decoded value is used for mapping the packet to the selected physical port, which was allocated by the CAC processor at step 62 above. In the four-bit example described above, the mapping function may be written explicitly as: Selected port number=((MPLS label) and (0x0000F)), wherein "and" denotes the "bitwise and" operator.

In an alternative embodiment, RSVP-TE processor 30 generates an arbitrary MPLS label at step 64 and stores this label together with the corresponding serial number of the selected physical port in a lookup table or other data structure. At step 70, the mapper extracts the MPLS label from each received MPLS packet and queries the lookup table with the MPLS label value to determine the physical port through which to switch the packet.

Inverse Hashing

Figure 4:
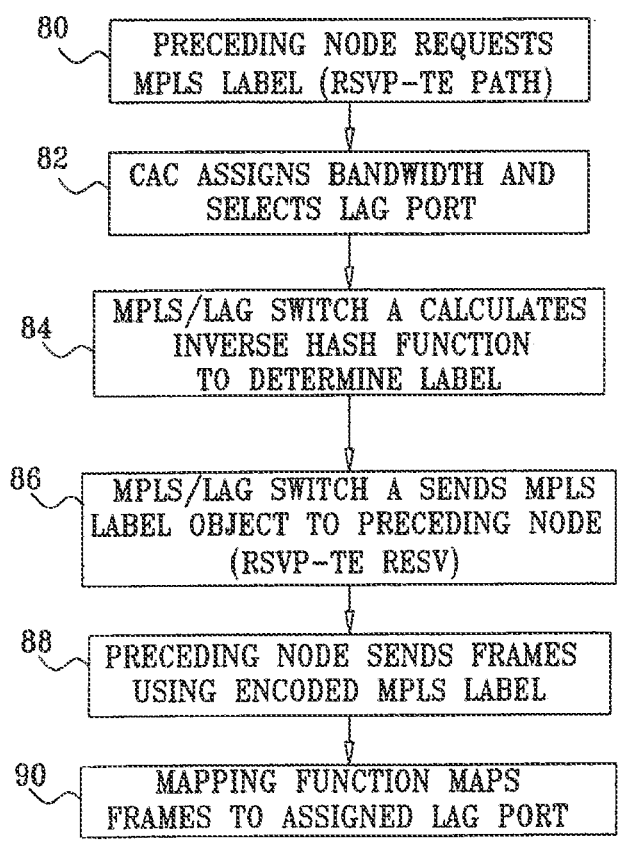
FIG. 4 is a flow chart that schematically illustrates a method for port allocation, in accordance with another embodiment of the present invention.

FIG. 4 is a flow chart that schematically illustrates an alternative method for port allocation, in accordance with another embodiment of the present invention. Similar to the method shown in FIG. 3 above, the method begins with the preceding node in MPLS network A asking to establish a part of MPLS tunnel 28 for sending MPLS packets to switch A. The preceding node sends downstream an RSVP-TE PATH message, at a label requesting step 80, which is identical to label requesting step 60 of FIG. 3 above. CAC processor 32 of switch A receives the PATH message, extracts the requested service properties, and selects a physical port out of group 25, at a port selection step 82. Step 82 is identical to port selection step 62 of FIG. 3 above.

In this method, the mapping function used by mapper 34 of switch A is a hashing function. Various hashing functions are known in the art, and any suitable hashing function may be used in mapper 34. Since the hashing operation is performed for each packet, it is desirable to have a hashing function that is computationally simple.

As mentioned above, the hashing function typically hashes the value of MPLS label 52 to determine the selected physical port, as the MPLS label uniquely identifies tunnel 28. For example, the following hashing function may be used by mapper 34: Selected port number=1+((MPLS label) mod N), wherein N denotes the number of physical Ethernet ports in LAG group 25, and "mod" denotes the modulus operator. Assuming the values of MPLS labels are distributed uniformly over a certain range, this function achieves a uniform distribution of port allocations for the different MPLS labels. It can also be seen that all packets carrying the same MPLS label (in other words—belonging to the same MPLS tunnel) will be mapped to the same physical port.

Returning to the description of FIG. 4. RSVP-TE processor 30 of switch A takes the serial number of the selected physical port (selected at step 82) and generates MPLS label 52 by calculating an inverse of the hashing function, at an inverse calculation step 84. The purpose of this step is to choose an MPLS label in a way that would cause the hashing function of mapper 34 to output the selected physical port (so that all subsequent packets carrying this label will be switched through this port). The following numerical example, which uses the hashing function given above, demonstrates the inverse hashing process:

The inverse of the hashing function given above is: MPLS label=(Selected port number−1)+N*MPLS.sub.p, wherein N denotes the number of physical ports in group 25, and MPLS.sub.p denotes a predetermined number, which is assigned by RSVP-TE processor 30 for each MPLS tunnel. Note that the value of MPLS.sub.p does not affect the hashing function, since different values of MPLS.sub.p only add integer multiples of N to the value of the MPLS label. The modulus operator of the hashing function eliminates this effect. This mechanism enables the same hashing/inverse-hashing functions to generate multiple MPLS labels to support multiple tunnels.

Assume that MPLS.sub.p=21882. Assume also that the LAG group has 3 ports (N=3) and that the CAC processor has selected physical port number 2 at step 82. The MPLS label calculated by the RSVP-TE processor at step 84 is thus given by: MPLS label=(2−1)+3*21882=65647

Having generated the MPLS label, RSVP-TE processor of switch A sends the MPLS label upstream to the preceding node, at a label sending step 86, which is identical to label sending step 66 of FIG. 3 above. At this stage, the part of tunnel 28 between the preceding node and switch A is provisioned and ready for use. The preceding node attaches the aforementioned MPLS label to all subsequent MPLS packets, belonging to tunnel 28, that are sent downstream to MPLS/LAG switch A, at a packet sending step 88.

Mapper 34 of switch A maps each received packet to the selected physical port of LAG group 25 using the hashing function, at a hashing step 90. Mapper 34 extracts the MPLS label from each received packet and uses the hashing function to calculate the serial number of the selected physical port, which was selected by the CAC processor at step 82. Following the numerical example given above, the mapper extracts MPLS label=65647 from the packet. Substituting this value and N=3 into the hashing function gives: Selected port number=1+(65647 mod 3)=2, which is indeed the port number selected in the example above.

Lag Protection

The IEEE 802.3ad standard cited above describes a protection mechanism for cases in which one of ports 24 fails or is intentionally taken out of service for any reason. In this case, the mapping function should distribute the data packets among the remaining ports. When using link aggregation in conjunction with tunneling methods such as MPLS, all packets belonging to a given tunnel should be switched through a single port 24. This property should be maintained in case of failure or port reconfiguration.

In an embodiment of the present invention, one of the N ports 24 of LAG group 25 is not used under normal network conditions and is maintained as a backup port. In the event that one of the active N−1 ports 24 fails or is taken out of service, switch A replaces the failed port with the backup port. As all ports 24 typically have equal bandwidths, the service properties required by tunnel 28 can be maintained.

In one embodiment, switch A may revert to the original port as soon as it recovers or returned into service. In an alternative embodiment, once the backup port has replaced a failed port, it continues to function as an ordinary port. The failed port, once recovered, begins to function as a backup port.

Although the methods and systems described hereinabove address mainly MPLS and Ethernet link aggregation, the principles of the present invention may also be used in conjunction with other communication protocols. For example, the methods described above may be adapted for use with other types of labeled traffic flows, such as flows labeled in accordance with other tunneling methods, and other link aggregation methods.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for use by an Ethernet switch device for switching Ethernet frames in a stand-alone unit, the Ethernet switch device comprises N multiple physical ports cooperating as an Ethernet Link Aggregation Group (LAG), each port operative for receiving and transmitting Ethernet frames, the method comprising:
assigning, in the Ethernet switch, a distinct number to each port of the multiple physical ports,
receiving, by a first Ethernet port of the Ethernet device, multiple Ethernet frames where each of the frames comprises a source address field, a destination address field, and a value carried in a first field other than the source or destination address fields;
applying a hash function that comprises a Modulo N function and that maps a respective assigned port number to each of the respective values in the first field of the multiple frames;
selecting, by the Ethernet device, for each frame of the multiple frames, a port from the multiple physical ports that is assigned a result of the hash function of the respective frame; and
sending, by the Ethernet device, each of the received multiple frames via the respective selected port,
wherein the Ethernet switch further comprises a Label-Switching Router (LSR) according to Multiprotocol Label Switching (MPLS) protocol, and wherein the first field further comprises an MPLS label field, and wherein the LAG is according to, based on, or compatible with, Clause 43 of IEEE Standard 802.3ad, 2002 Edition.

2. The method according to claim 1, wherein the Ethernet switch further comprises a processor and a software executed by the processor, the method further comprising controlling, by the processor, the receiving and sending of Ethernet frames respectively at the first port and at the multiple physical ports.

3. The method according to claim 1, wherein the hash function comprises, uses, or is based on, 1+((indicator value) mod (N)), wherein the 'mod' is a modulo operator.

4. The method according to claim 1, further comprising encapsulating or decapsulating the value in the MPLS label field.

5. The method according to claim 1, wherein the first field further comprises a Pseudo Wire (PW) label or a Virtual Connection (VC) label field.

6. The method according to claim 1, wherein the first field further comprises a Virtual Local Area Network (VLAN) Ethertype or a VLAN tag.

7. The method according to claim 1, further comprising defining a tunnel via the Ethernet device that includes the selected port, and varying the multiple frames over the tunnel.

8. The method according to claim 7, wherein the tunnel is unidirectional or bidirectional.

9. The method according to claim 7, wherein the selecting comprises selecting a port having a minimum available bandwidth among the multiple physical ports, which is not less than a bandwidth requirement of the tunnel.

10. The method according to claim 1, further comprising inserting into the first field a set of bits that identify the selected port.

11. The method according to claim 1, wherein each of the source and destination addresses is a Media Access Control (MAC) address.

12. The method according to claim 1, further comprising receiving at the first Ethernet port a request message that comprises a data packet label associated with a network tunnel for configuration of the network tunnel.

13. The method according to claim 12, wherein the request message is received from a preceding MPLS/LAG switch.

14. The method according to claim 12, wherein the request message comprises an RSVP-TE PATH message augmented with a LABEL_REQUEST object.

15. The method according to claim 14, wherein the request message comprises an indication of a service property, and wherein the selecting of the selected port comprises identifying a physical port in compliance with the service property.

16. The method according to claim 15, wherein the service property comprises a guaranteed bandwidth, a peak bandwidth, or a class of service.

17. The method according to claim 1, wherein the selecting is further based on selecting a port having a maximum available bandwidth among the multiple physical ports.

18. The method according to claim 1, further comprising protecting against a failure or against taking out of service of a port of the multiple physical ports.

19. The method according to claim 18, wherein the protecting comprises a revertive protection.

20. The method according to claim 1, further comprising:
    detecting a failure or out-of-service state of the selected port;
    selecting a second port from the multiple physical ports in response to the first value and to the detecting of the failure or out-of-service state; and
    sending each of the received multiple frames via the selected second port.

21. The method according to claim 20, further comprising:
    detecting a recovery from the failure or out-of-service state of the selected port;
    selecting the first port from the multiple physical ports in response to the first value and to the detecting of the recovery; and
    sending each of the received multiple frames via the selected port.

22. The method according to claim 20, further comprising defining a backup port distinct from the selected port from the multiple physical ports, and wherein the selected second port is the backup port.

23. The method according to claim 1, wherein all ports of the LAG have equal bandwidth.

24. The method according to claim 1, for use with an additional Ethernet switch, the method further comprising:
    preparing, by the additional Ethernet switch, the multiple frames by the additional Ethernet switch
    sending, by the additional Ethernet switch, the multiple frames via the first Ethernet port.

25. The method according to claim 24, wherein the preparing comprises calculating and inserting the value in the first field of each of the multiple frames.

26. The method according to claim 25, wherein the calculating of the value provides for the selecting, by the Ethernet device, the selected port from the multiple physical ports.

27. The method according to claim 1, wherein the sending comprises sending the received multiple frames in the same order of their receiving by the Ethernet device.

28. The method according to claim 1, for use with multiple possible values in the first field, and for use with a memory, in the Ethernet device, that stores an association of a single port out of the multiple physical ports to each of the possible values, wherein the selection is based on using the memory.

29. The method according to claim 28, further comprising, storing, by the Ethernet device, the association in the memory.

* * * * *

UNITED STATES PATENT AND TRADEMARK OFFICE
CERTIFICATE OF CORRECTION

| | |
|---|---|
| PATENT NO. | : 11,838,205 B2 |
| APPLICATION NO. | : 17/882572 |
| DATED | : December 5, 2023 |
| INVENTOR(S) | : Ronen Solomon |

Page 1 of 1

It is certified that error appears in the above-identified patent and that said Letters Patent is hereby corrected as shown below:

On the Title Page

Related U.S. Application data (63), Page 2, Column 1, Line 14, instead of "Aug. 17, 2012"; should be – Aug. 17, 2013 –.

In the Claims

In Column 9, Line 52, Claim 1, the second appearance of the word "frames" should be replaced with – frame –;
In Column 9, Line 67, Claim 1, the word "a" should be added before the word "Multiprotocol";
In Column 11, Line 24, Claim 23, the word "an" should be added before the word "equal"; and
In Column 12, Line 4, Claim 24, the following "; and" should be added at the end of the line after the word "switch".

Signed and Sealed this
Third Day of September, 2024

Katherine Kelly Vidal
*Director of the United States Patent and Trademark Office*